3,459,522
METHOD OF TREATING A POROUS, HIGH SILICA CONTENT GLASS
Thomas H. Elmer and Martin E. Nordberg, Corning, N.Y., assignors to Corning Glass Works, Corning, N.Y., a corporation of New York
No Drawing. Continuation of application Ser. No. 293,249, July 8, 1963. This application Aug. 1, 1967, Ser. No. 657,708
Int. Cl. C03c 21/00, 17/08
U.S. Cl. 65—30     10 Claims

ABSTRACT OF THE DISCLOSURE

A method of removing residual water from a porous, high silica content, glass body in a flowing stream of a substantially dry, chlorine containing atmosphere at a temperature of 600°–1000° C. for a sufficient time, the atmosphere having such a low moisture content as to replace hydroxyl ions by chlorine ions and consolidating the treated porous body in a dry, nonoxidizing atmosphere to produce a nonporous, transparent substantially water-free glass article.

---

This is a continuation application of my copending application, Ser. No. 293,249, filed July 8, 1963, and now abandoned.

This invention relates to the treatment of a porous, high silica content glass to remove or eliminate residual water from the glass.

Consolidated high silica glassware is well known under the commercial designation, "96% silica glass." Such a consolidated, non-porous glass body is produced from a porous glass body corresponding in shape and composition but larger in size and characterized by a multiplicity of intercommunicating, submicroscopic pores throughout its mass. This porous glass body is in turn produced from a parent glass body molded from a selected borosilicate glass. The basic production steps involved, and a particularly suitable family of parent borosilicate glasses, are described in U.S. Patent No. 2,221,709, issued to Hood et al. on Nov. 12, 1940.

Briefly, the method includes (1) forming or fabricating an article of desired shape from a parent borosilicate glass; (2) thermally treating the glass article at a temperature of 500 to 600° C. for a period of time to separate the glass into a silica-rich phase and a silica-poor phase; (3) dissolving or leaching the silica-poor phase, usually with acid, to produce a porous structure composed of the silica-rich phase; (4) washing to remove leaching residue, and drying; (5) thermally consolidating the porous structure into a non-porous vitreous article by heating without fusion. The consolidated article has the general shape of the original glass article, but is reduced by about one-third in volume. The maximum consolidation temperature is above 900° C., and on the order of 1200–1300° C. in higher silica content glasses. For convenient reference, the basic method steps are set forth below in block diagram form:

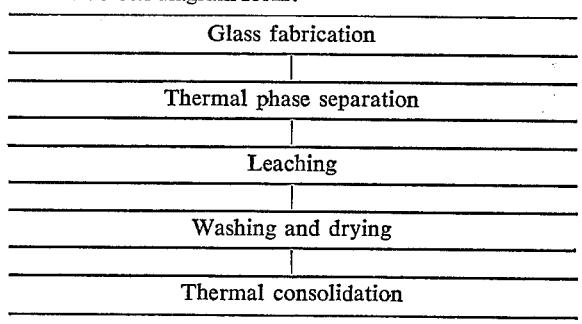

The consolidated glass thus produced is characteristically resistant to thermal shock and/or deformation. It is also readily adapted to provide controlled radiation transmitting characteristics by removal of absorbing materials during leaching and/or by impregnation with a selected material prior to firing of the porous glass. This potential combination of properties renders these glasses of particular utility in the production of massive optical blanks and the like, as well as for envelopes for lamps having high operating temperatures, such as mercury arc lamps and infrared lamps.

However, ordinary methods of drying and heat treating such high silica glassware in air result in a minute amount of water, incorporated in the structure of the glass, that we term "residual water." This water interferes with use of the glass in certain applications. It may cause bubbling in lampworking, and operating problems in high temperature arc lamps. It also decreases transmission of infrared radiation.

Residual water causes a strong absorption of infrared at a wave length of 2.72 microns, resulting in a sharp break in the transmittance curve. Absorption, or conversely transmittance, at a wave length of 2.6 microns is relatively insensitive to the low concentrations involved in residual water. Residual water content is therefore commonly specified in terms of an absorption coefficient, hereafter called "beta value" and designated "$\beta_{OH}$," which is calculated from the formula:

$$\beta_{OH} = \frac{1}{t} \log_{10} \frac{T_{2.6}}{T_{2.72}}$$

wherein $t$ = glass thickness in mm.
$T_{2.6}$ = transmittance in percent at 2.6 microns
$T_{2.72}$ = transmittance in percent at 2.72 microns and
$\beta_{OH}$ is in terms of mm.$^{-1}$.

U.S. Patent No. 2,982,053 describes removing such water from porous glass by a fluorine treatment. Other materials, particularly other halides, were found to be ineffective. In accordance with that patent, fluorine containing materials are introduced into the porous glass either by impregnating at room temperature or by gaseous contact at higher temperatures. Normally, the impregnating technique has been used.

While the fluoride treatment in the patent is quite effective for many purposes, there are certain problems involved in its use. In particular, cracking frequently occurs when porous glass having a thickness of a half inch or greater is dewatered by the technique of impregnation with a fluorine material. On the other hand, close control is necessary to avoid glass corrosion, particularly in the higher temperature treatment with fluorine compound vapors.

It is a primary purpose of the present invention to provide an effective and economical method of treating porous high silica glass to remove residual water. Another purpose is to provide a method which overcomes the problems encountered in using fluorine material for this purpose. A further purpose is to improve properties in a high silica content glass, in particular infrared transmission and/or lampworking characteristics by water removal. Another purpose is to provide an improved method of treating relatively thick porous glass bodies. A still further purpose is to provide a method of effective water removal without the use of vacuum in final high temperature consolidation.

We have now found that these and other purposes can be accomplished by exposing high silica glass in the leached, porous state to a chlorine containing atmosphere within a limited range of elevated temperatures. Contrary to prior belief, we have found that such exposure results in the removal of hydroxyl ions from the porous glass with replacement by chlorine ions. We have further found that residual water can be essentially eliminated without corrosive chemical attack on the glass by the chlorine treatment. In addition, we have found that the low water content level achieved by chlorine treatment can be readily maintained by conducting the subsequent consolidation operation in a neutral and preferably nitrogen atmosphere.

Based on these discoveries, our invention resides in a method of removing residual water from a porous, high silica content, glass body that comprises exposing the glass to a gaseous, chlorine containing atmosphere having such a low moisture content and at a temperature within a range of about 600° C. to about 1000° C. for a time sufficient to permeate the glass and replace hydroxyl ions by chlorine ions whereby an appreciable change in the beta value is effected. Preferably the method involves passing chlorine gas over the hot porous glass for a predetermined period of time and thereafter heating the glass to effect consolidation in vacuum or an inert dry atmosphere, preferably a nitrogen atmosphere.

Any chlorine containing material that is normally gaseous, or that vaporizes at temperatures on the order of 600 to 1000° C., may be employed. Metal chlorides and organo-chlorides are effective for dewatering purposes, but are less desirable because of the potential problem of a foreign material residue in the porous glass after treatment. Also, materials which must be vaporized are undesirable because of the difficulty in handling and maintaining a continuing flow of vapor over the glass. Gaseous chlorine and hydrogen chloride are preferred on the basis of cost and convenience of use. These may be employed as such or diluted with up to 90% of an inert gas, such as nitrogen. Accordingly, the term, "chlorine containing atmosphere," is used to mean an atmosphere containing on the order of 10% or more of either chlorine gas or a chloride vapor as herein described.

The dissociation products of ammonium chloride or, alternatively, a mixture of dry ammonia and hydrogen chloride vapors may be employed. In general, this requires a higher temperature and/or longer time of treatment for comparable effectiveness, probably due to dilution. However, it effectively raises the glass annealing point, and dewaters the glass in a single treatment.

Chlorine treatment removes water extremely slowly, if at all, at temperatures below about 600° C. Accordingly, such lower temperatures are essentially impractical. The rate of water removal increases with temperature with the limit being imposed by incipient pore closure, that is initiation of consolidation. This occurs at 950° C. or higher depending on the residual flux content of the porous glass. Preferably then the chlorine treatment is carried out at about 700 to 900° C.

The time of treatment will depend on the degree of dewatering desired, glass thickness, and temperature of the glass during treatment. For example, it has been found that essentially complete removal of water from tubing having a 1 millimeter thick wall is accomplished in several minutes at temperatures of 800° C. and above, whereas several hours are required at 600–650° C. The interrelationship of time, temperature and glass thickness is shown more clearly below.

Subsequent to the treatment in a chlorine containing atmosphere, the porous glass may be maintained in such atmosphere while the temperature is increased to a consolidation temperature, normally 1250–1300° C. This may be undesirable from an economic standpoint; may result in retention of an excess amount of chlorine within the glass; and may cause splitting of the glass at high $Cl_2$ concentrations. Alternatively then, the chlorine treated porous glass is removed from the chlorine atmosphere and transferred to an inert atmosphere, such as nitrogen, for further heat treatment. It has been found that firing in a hydrogen atmosphere tends to remove chlorine from the glass and increase the water content of the final fired glass, thereby nullifying the effect of the chlorine treatment. Firing in air or other oxygen containing atmosphere also is detrimental in this respect, but may be tolerated in some instances where rapid final firing can be used. Accordingly, it is generally desirable to employ either an inert atmosphere or a vacuum furnace for the consolidation step.

The invention is further described with reference to specific embodiments thereof in the following examples:

EXAMPLE 1

A dozen porous, 96% silica glass samples were prepared in four different thicknesses and divided into three test groups, each group consisting of one sample of each glass thickness. Each group was inserted in a two-inch diameter glass combustion tube and heat treated for a predetermined time of 2, 4 or 8 hours at 750° C. with chlorine gas flowing through the tube at a flow rate of 100 cc./minute.

The samples were then transferred hot into a vacuum furnace at 750° C.; heated to 900° C.; held at 900° C. for 30 minutes; successively heated to and held for one hour at 950° C.; 1000° C.; and 1050° C.; heated to about 1250° C. for one-half hour; then cooled. The entire cycle after transfer is with the furnace or chamber evacuated. The hold times are those normally employed commercially for water removal in ordinary vacuum firing, with the final firing at 1250° C., or somewhat above, being conventional porous glass consolidation practice.

A set of blank samples were prepared for comparative purposes. These were treated in essentially identical manner except that the chlorine treatment was omitted.

Infrared transmittance measurements were then made on each sample with a Perkins Elmer Model 21 recording infrared spectrophotometer. Beta values were as follows:

TABLE I

| Time (hours) | Thickness | | | |
| --- | --- | --- | --- | --- |
|  | 4 mm. | ¼" | ⅜" | ⅝" |
| 2 | 0.002 | 0.013 | 0.62 | .041 |
| 4 | 0.001 | .001 | .001 | .006 |
| 8 | 0.001 | .001 | .002 | .001 |
| Blank | 0.34 | .22 | .14 |  |

The ⅝" blank contained too much water for measurement. The variations in the blanks are normal and indicate variations in earlier stages of porous glass preparation. In general, ordinary beta values for vacuum fired glass may vary from 0.15 to 0.35 and average about 0.25.

For an evaluation of effectiveness, infrared transmitting glass normally requires a beta value of 0.015 or lower; high temperature arc lamp envelopes may have beta values up to around 0.020; while simply attaining prior vacuum fired values of about 0.25 may materially improve lampworking characteristics. The sensitivity of measuring equipment is such that values of 0.003 and lower are not significantly different and may be considered as water free.

Briefly, Table I indicates the variation in time required to achieve comparable beta values in different glass thicknesses. It may be noted that the thinner samples, having longer time chlorine treatment, tended to split along a center plane. This indicates the undesirability of unduly long or severe treatment.

EXAMPLE 2

A similar set of samples to those of Example 1 was prepared and divided into test groups. This time each group was fired for two (2) hours in chlorine gas in accordance with Example 1, but at varying temperatures of 750° C., 800° C., 850° C., 900° C. and 950° C.

After chlorine treatment, the samples were transferred and vacuum fired to consolidation as in Example 1. Transmittance measurements were made in like manner with the calculated beta values being:

TABLE II

| Temperature (° C.) | Thickness | | | |
|---|---|---|---|---|
| | 4 mm. | ¼" | ⅜" | ⅝" |
| 750 | 0.002 | 0.013 | 0.062 | 0.041 |
| 800 | 0.002 | 0.002 | 0.011 | 0.056 |
| 850 | 0.002 | 0.002 | 0.003 | 0.017 |
| 900 | 0.002 | 0.002 | 0.002 | 0.004 |
| 950 | 0.002 | 0.004 | | |

Briefly, Table II indicates the interdependence of temperature of chlorine treatment and porous glass thickness. Taken with Table I, it clearly indicates the manner in which temperature and time of the chlorine treatment may be coordinated for effective dewatering of any glass thickness.

EXAMPLE 3

A four (4) mm. thick, porous, glass sample was prepared and treated in chlorine gas at 900° C. for two hours in accordance with Example 1. The sample was transferred to a vacuum furnace at 750° C.; heated in vacuum to 1300° C. at seven degrees per minute without any hold periods; held for 30 minutes to effect consolidation; and cooled. The beta value calculated from transmittance measurement as in Example 1 was 0.004. This demonstrates that the normal length vacuum firing schedule may be greatly shortened by means of chlorine treatment.

EXAMPLE 4

Porous, 96% silica, glass tubing of about one (1) mm. wall thickness was fired six (6) hours at 600° C. in chlorine as in Example 1. A second sample was fired six (6) hours at 625° C. Both tubing samples were then transferred to a vacuum furnace at 750° C. and fired on the consolidation schedule of Example 1. Calculated beta values were 0.07 for the 600° C. sample and 0.01 for the 625° C. sample. This indicates that temperatures below 600° C. would be ineffective or impractical.

EXAMPLE 5

Porous, 96% silica, glass tubing samples of about one (1) mm. wall thickness were heat treated in a flowing chlorine atmosphere diluted in varying amounts with nitrogen. The samples were each treated one hour at 800° C., then consolidated in a vacuum furnace with the normal dewatering cycle of Example 1.

The flow rates and corresponding calculated beta values were:

| Flow rate (cc./min.) | | |
|---|---|---|
| $Cl_2$ | $N_2$ | Beta |
| 10 | 90 | 0.25 |
| 30 | 270 | 0.02 |
| 25 | 75 | 0.001 |

As indicated earlier, a blank beta value is about 0.25. Thus at 10% $Cl_2$ the treatment is effective only with increased flow rate, whereas at 25% the slower rate is adequate.

EXAMPLE 6

A tubing sample was prepared and measured in accordance with Example 5, except the chlorine treatment was five (5) minutes at 800° C. with a flow of 100 cc. pure chlorine gas per minute. The beta value was 0.02. This indicates the effectiveness of even a short time treatment. However such short times may be difficult to control reproducibly.

EXAMPLE 7

A ¼" thick, flat sample of porous, 96% silica glass was heat treated at 750° C. in a 100 cc./minute flow of chlorine gas for three (3) hours. It was transferred to another furnace at 750° C. and consolidated, as per schedule in Example 1, in a dry nitrogen atmosphere rather than vacuum. The beta value was 0.001 indicating an inert atmosphere is equivalent to vacuum for consolidation firing after chlorine dewatering.

EXAMPLE 8

Two samples of one mm. wall, porous tubing were heated at 900° C. for 30 minutes in chlorine gas flowing at a rate of 100 cc./minute. One sample was consolidated in vacuum on the regular schedule and had a beta value of 0.003. The second was consolidated in dry air with an extremely rapid firing of 750° C. to 1300° C. in 40 minutes. The sample had excellent lampworking properties and a beta value of 0.02. With longer consolidation times in dry air, however, increasingly higher beta values were found. This indicates dry air may be used in some instances where complete water removal is unnecessary and rapid consolidation is possible. For example, such practice provides an alternative means for achieving beta values comparable to those attained by present vacuum firing practice, these frequently being adequate to permit lampworking without bubbling.

EXAMPLE 9

A sample of one mm. wall, porous tubing was treated at 800° C. for 30 minutes in a stream of chlorine gas flowing at the rate of 100 cc./minute. At the conclusion of this treatment, the furnace temperature was raised to 1250° C. at a rate of 100 degrees per hour with the flow of chlorine gas being maintained. The furnace was then held for a half hour at 1250° C. to completely consolidate the porous glass and then cooled. The calculated beta value of this treated tubing was 0.002, thus indicating the effectiveness of chlorine gas as a consolidation atmosphere.

EXAMPE 10

Three samples of flat, porous glass having a thickness of 4 mm. were treated at 750° C. for two hours in a stream of chlorine gas flowing at the rate of 100 cc./minute. For comparison of consolidation atmospheres, each of the three samples was consolidated in accordnace with the thermal schedule set forth in Example 1, but in a different furnace atmosphere. One sample was fired in vacuum, as in Example 1; a second fired in nitrogen; the third fired in dry air. For further comparison, an identical sample of the porous glass, but without the chlorine treatment, was consolidated on the same schedule in the vacuum furnace. Each sample was analyzed for chlorine content and also measured for infrared transmission to premit calculation of beta values. The results follow:

TABLE III

| Sample | $Cl_2$, percent | Beta |
|---|---|---|
| Vacuum | 0.35 | 0.002 |
| Nitrogen | 0.45 | 0.002 |
| Dry air | 0.03 | 0.130 |
| Blank | 0.006 | 0.34 |

Data of the type presented above lead to the conclusions that a substantial amount of chlorine is retained in a dewatered glass and that the process involves the substitution of chloride ions for hydroxyl ions in the glass. This data laso indicates a tendency to reversibility, as well as substitution of oxygen for chlorine ions, when the consolidation is carried out in air. When a hydrogen containing atmosphere is utilized in consolidation, an even greater increase in beta is observed.

EXAMPLE 11

A sample of one mm. wall, porous glass tubing was treated at 900° C. for one hour in a stream of hydrogen chloride gas flowing at a rate of about 100 cc./minute. It was then transferred to a vacuum furnace and consolidated in vacuum as per the consolidation schedule of Example 1. The calculated beta value was essentially zero, but the sample split at the glass center plane indicating a more severe chloride treatment than necessary.

EXAMPLE 12

A sample of one mm. wall, poruos glass tubnig was heated at 800° C. for one hour in a stream of carbon tetrachloride ($CCl_4$) and nitrogen ($N_2$). The gaseous mixture was produced by bubbling 50 cc. of dry nitrogen per minute through a container of $CCl_4$ at 55° C., the total amount of liquid $CCl_4$ entrained in one hour being ten (10) ml. After consolidation of the treated tubing in a vacuum furnace per the schedule of Example 1, a beta value of essentially zero was found for the tubing.

EXAMPLES 13 AND 14

Samples of one mm. wall, porous glass tubing were treated and consolidated in the manner described in Example 12 except that silicon tetrachloride ($SiCl_4$) replaced $CCl_4$ in one test and tri-chloro-ethylene replaced it in a second test. In the first test, 20 ml. of $SiCl_4$ was evaporated and entrained by the nitrogen flow in an hour; in the second test, three (3) ml. of tri-chloro-ethylene was observed to have been removed and carried into the treating tube.

A beta value of essentially zero was found for each sample of consolidated tubing. However, the $SiCl_4$ treated sample had the appearance of a slight opacity while the other sample had a slight gray color, each indicating some residual material from the treatment.

EXAMPLE 15

A sample of one mm. wall, porous glass tubing was preheated in air to 850° C. It was transferred to an atmosphere furncae and held at 800° C. for one hour while exposed to a stream of $N_2$ and ammonium chloride ($NH_4Cl$) vapors. The stream was produced by sweeping 50 ml./minute of nitrogen over ammonium chloride in the entry to the furnace, a total of 22 grams of $NH_4Cl$ being vaporized, and to some extent dissociated, during the hour treating time. The glass sample was then transferred to a vacuum furnace and heated in accordance with the consolidation schedule of Example 1, except that final consolidation was for one-half hour at 1300° C.

A beta value of 0.010 was calculated from infrared measurements. Also, the consolidated glass was found to have an annealing point temperature of 1097° C. as compared to about 1047° C. for comparison samples treated identically except for the atmosphere treatment at 800° C.

EXAMPLE 16

Corresponding treatment of porous, 96% silica glass samples in flowing streams of bromine and iodine vapors, carried by nitrogen gas with a total pressure of one atmosphere and at temperatures of 800° C., 900° C. and 975° C. for one hour, have failed to show any appreciable decrease in residual water as indicated by beta value determinations.

Numerous modifications and embodiments of the invention will become apparent from the foregoing disclosure. In particular, the product of the invention may find utility in either porous or consolidated form.

We claim:
1. A method of making a substantially water-free article of high silica content comprising the steps of:
    (a) forming a shaped body from a borosilicate glass;
    (b) thermally treating the glass body at a temperature and for a period of time sufficient to separate the glass into a silica-rich phase and a silica-poor phase;
    (c) leaching the silica-poor phase to produce a high silica glass body having a porous structure;
    (d) treating the porous body in a flowing stream of a substantially dry, chlorine containing atmosphere at a temperature of 600°–1000° C. for a sufficient time, said atmosphere having such a low moisture content as to replace hydroxy ions by chlorine ions; and
    (e) consolidating the treated porous body in a dry, non-oxidizing atmosphere or vacuum to produce a non-porous, transparent, substantially water-free glass article having a maximum beta OH value of 0.02 mm.$^{-1}$.

2. The method of claim 1, wherein the porous high silica glass body is subjected to a preheating step at elevated temperatures to remove mechanically held water prior to said treating.

3. The method of claim 2, wherein said preheating is at a temperature of about 850° C.

4. The method of claim 1, wherein said treating of the porous glass body is at a temperature of 700–900° C.

5. The method of claim 1, wherein said treating of the porous glass is for a time of five minutes to six hours.

6. The method of claim 1, wherein said chlorine containing atmosphere is a member selected from the group consisting of chlorine and anhydrous hydrogen chloride.

7. The method of claim 6, wherein the flow rate of said atmosphere is about 100 cc./minute through a combustion tube having a diameter of approximately two inches.

8. The method of claim 1, wherein said consolidating is at a temperature of about 1250–1300° C.

9. The method of claim 1, wherein said consolidating is in a nitrogen atmosphere.

10. The method of claim 1, wherein said glass article has a thickness of at least at half inch and an absence of a water absorption band at a wave length of 2.72 microns.

References Cited

UNITED STATES PATENTS

| | | | |
|---|---|---|---|
| 2,904,713 | 9/1959 | Herapus et al. | 65—134 |
| 2,982,053 | 5/1961 | Elmer | 65—30 |

S. LEON BASHORE, Primary Examiner

ROBERT L. LINDSAY, Jr., Assistant Examiner

U.S. Cl. X.R.

65—32, 33, 111